Sept. 21, 1943.  W. H. CHURCHILL  2,330,169
ROTARY STUD FASTENER AND INSTALLATION THEREOF
Filed Oct. 23, 1942
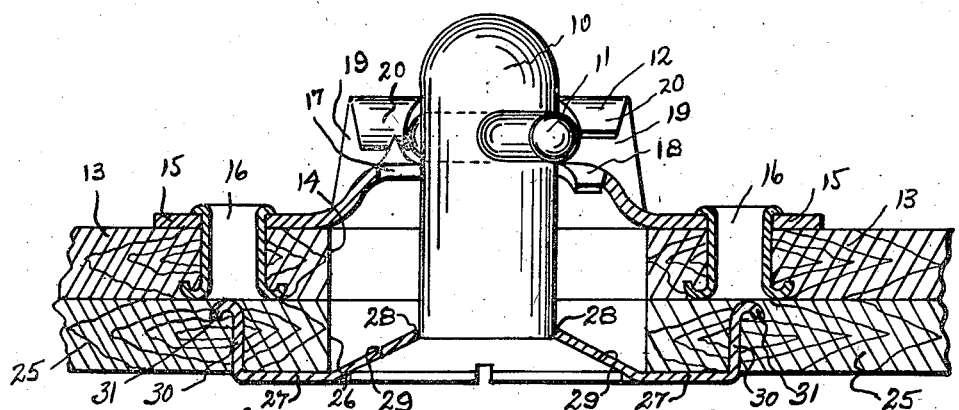
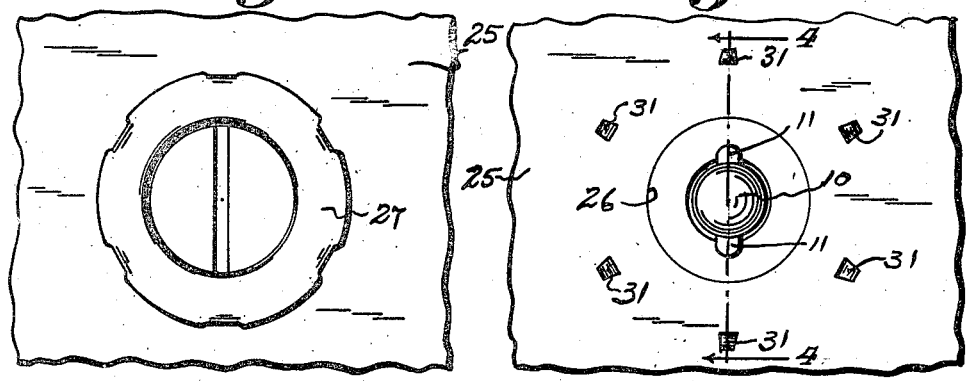
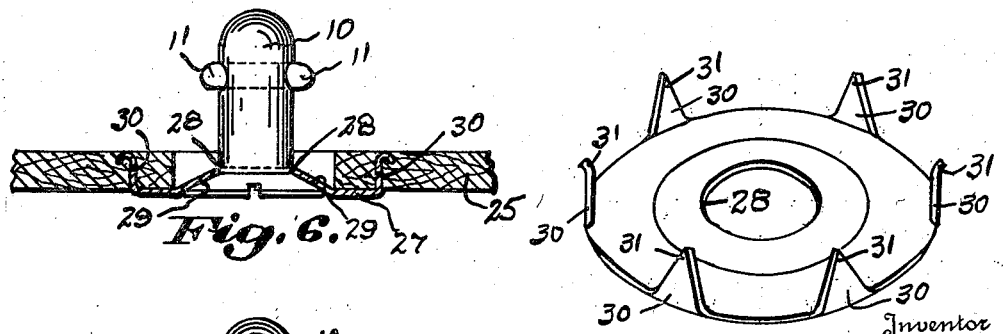
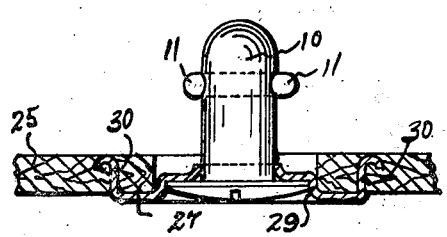
Inventor
Wilmer H. Churchill.
By Walter S. Jones
Attorney Patented Sept. 21, 1943

2,330,169

UNITED STATES PATENT OFFICE 2,330,169

ROTARY STUD FASTENER AND INSTALLATION THEREOF

Wilmer H. Churchill, Saugus, Mass., assignor to United-Carr Fastener Corporation, Cambridge, Mass., a corporation of Massachusetts Application October 23, 1942, Serial No. 463,035

6 Claims. (Cl. 24—221)

The present invention relates to rotary stud fastener installations of the type employing a rotary stud member formed with a lateral projection, as for example a radial pin, and mounted in a part to be secured to a support, which stud member is designed, upon partial rotation, to interlock with a socket member attached to the support.

Fasteners of the above described type are extensively used in the airplane industry to secure airplane cowling and like sheets to their supports. In the manufacture of certain types of planes the sheets or parts to be secured to the support are of non-metallic material, such as fiber board or plywood, and are substantially softer than metal sheets. Difficulty has been experienced in securely attaching the fastener parts to such softer non-metallic parts.

The present invention aims to improve and simplify generally the construction and efficiency of the means for attaching the rotary stud fastener to its supporting part, although this same type of part may be used in connection with other parts, such as screws and bolts.

Illustrative of the invention, reference is made to the accompanying drawing, in which Fig. 1 is a vertical sectional view of a rotary stud fastener installation according to the invention;

Fig. 2 is a plan view thereof as viewed from the outer face of the stud-carrying part;

Fig. 3 is a plan view thereof as viewed from the opposite face thereof, the socket and the support being removed;

Fig. 4 is a vertical sectional view as taken on the line 4—4 of Fig. 3;

Fig. 5 is a detail perspective view of the stud-attaching member; and

Fig. 6 is a section like that shown in Fig. 4, but with a round head instead of a flat head stud.

Referring to the drawing, the fastener installation to which the invention relates preferably is of the type comprising a rotary stud member 10 formed with radial arms 11 adapted for locking engagement with a socket member 12 attached to a suitable support 13 and overlying an aperture 14 therein.

The socket member may be of any of the approved types, the type shown herein being selected merely for the purposes of illustration. Conveniently it comprises a base 15 which may be suitably attached to the support 13, as by rivets 16, and a central outwardly dished portion, apertured as at 17 to permit the passage of the stud 10 and radial arms 11, and providing a cam seat 18 for interlocking engagement with the radial arms 11 of the stud 10. Portions 19 integrally connected with the base 15 on opposite sides of the aperture may be bent upwardly and inwardly to provide locking means 20 adapted to overlie the radial arms 11 of the stud in its rotated locked position, as will be understood by those skilled in the art. The particular form of socket member 12 illustrated herein is not an essential feature of the invention and reference is made to Patent No. 2,306,928, granted December 29, 1942 to William A. Bedford, for a more complete description thereof.

The part 25 to be attached to the support and in which the stud member is rotatably mounted is of non-metallic material, such as plywood, fiber board and the like, and the invention provides improved means for attaching said fastener part to a sheet of such material. Advantageously said part 25, which is herein illustrated as being of plywood, is provided with a suitable aperture 26 substantially larger than the diameter of the stud 10 through which said stud extends.

The stud is rotatably mounted in the aperture 26 of the part 25 by means of an attaching plate 27, advantageously formed of thin stiff sheet metal of a size substantially larger than the aperture 26. The central portion of the plate 27 is apertured as at 28 for the passage of the shank of the stud 10, and portions of the plate surrounding the aperture 28 may be dished to provide a stud head-receiving recess 29 of any desired shape, as illustrated in Figs. 4 and 6. Preferably the stud head-receiving recess is of less diameter than the aperture so that said recess as well as the stud head may be confined within the planes of the opposed faces of the part 25, or substantially so. Thus either a flat head or round head stud may be used.

The outer peripheral edge of the attaching plate is formed with a plurality of integral prongs 30 extending at right angles therefrom in the direction of the recess. These prongs advantageously are formed with pointed outwardly curved free ends 31 which are capable of being forced straight through the material of the part 25 by pressure applied to the outer face of the attaching plate.

In applying pressure on the attaching plate to force the prongs through the part 25, a metal backing plate (not shown) is usually applied against the opposite face of the part 25. When the outwardly curved pointed ends 31 of the prongs 30 strike the plate, they are curled outwardly by the continued pressure so that they are well clenched and lie wholly embedded in the relatively soft material of the part 25. This provides a secure and effective mounting for the fastener part which will not pull out of the relatively soft material of the part 25 even when subjected to unduly heavy stress.

It will be apparent that the stud member may be pre-assembled with the attaching plate 27 prior to attachment to the part 25 by merely passing the stud shank through the aperture 28 and thereafter inserting the pin 11 through an opening drilled through the stud.

While I have illustrated and described a preferred embodiment of my invention, I do not wish to be limited thereby, because the scope of my invention is best defined by the following claims.

I claim:

1. The combination of a fastener member with a non-metallic supporting part having an aperture therein, of means for supporting said fastener member in the aperture of said part, said means comprising a plate-like member bearing against one face of said part around said aperture and supporting said fastener member therein, and a plurality of integral prongs on said plate extending through said part and clenched into the material of said part.

2. In a rotary operative fastener of the type comprising a rotary stud and a cooperating socket member, in combination with a relatively soft plywood supporting part having an aperture therein, of means for mounting one of the fastener parts in the aperture of said part, said means comprising a plate-like member bearing against one face of said part around said aperture and supporting said fastener part therein, and a plurality of integral prongs on said plate extending through said part and clenched therein adjacent the opposite face thereof.

3. In a rotary operative fastener of the type comprising a rotary stud member and a cooperating socket member, in combination with a non-metallic supporting part having an aperture therein and in which one of said members is mounted, of an attaching means for attaching said member to said part comprising a plate-like portion of greater size than said aperture and having a member supporting portion disposed therein, said plate-like portion engaging one face of said part surrounding said aperture and formed along its peripheral edge with a plurality of angularly extending prongs extending through said part and clenched therein adjacent the opposite face thereof.

4. In combination with a non-metallic supporting part having an aperture therein, of a rotary stud fastener member having a shank and an enlarged head at one end thereof, attaching means for rotatably mounting said stud fastener member is said part aperture, said attaching means comprising a plate-like member overlying said part aperture and the marginal edge portion of said part, said plate-like member having a central aperture within said part aperture for the passage of the shank of said stud and means located on the peripheral edges of said plate-like member for securing said attaching means to said part.

5. In combination with a non-metallic supporting part having an aperture therein, of a headed rotary stud fastener member having a shank and an enlarged head at one end thereof, attaching means for rotatably mounting said stud fastener member in said part aperture, said attaching means comprising a plate-like member overlying said part aperture and the marginal edge portion of said part, said plate-like member having a stud head-receiving recess positioned within said part aperture and a central opening for the passage of the shank of said stud, and means located on the peripheral edges of said plate-like member for securing said attaching means to said part.

6. In combination with a non-metallic supporting part having an aperture therein, of a headed rotary stud fastener member having a shank and an enlarged head at one end thereof, attaching means for rotatably mounting said stud fastener member in said part aperture, said attaching means comprising a plate-like member overlying said part aperture and the marginal edge portion of said part, said plate-like member having a stud head-receiving recess positioned within said part aperture and a central opening for the passage of the shank of said stud, and a plurality of integral prongs connected to the said plate-like member and extending through said part and clenched therein adjacent the opposite face thereof.

WILMER H. CHURCHILL.